US010983804B1

United States Patent
Durkop, III et al.

(10) Patent No.: US 10,983,804 B1
(45) Date of Patent: Apr. 20, 2021

(54) PATCHING A BINARY FILE

(71) Applicant: Raytheon Company, Waltham, MA (US)

(72) Inventors: Luther John Durkop, III, Cedar Park, TX (US); Lawrence R. Waldo, Indialantic, FL (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/714,472

(22) Filed: Dec. 13, 2019

(51) Int. Cl.
*G06F 9/445* (2018.01)
*G06F 8/76* (2018.01)
*G06F 9/54* (2006.01)
*G06F 9/38* (2018.01)
*H04L 29/12* (2006.01)

(52) U.S. Cl.
CPC ............ *G06F 9/44521* (2013.01); *G06F 8/76* (2013.01); *G06F 9/3836* (2013.01); *G06F 9/44505* (2013.01); *G06F 9/541* (2013.01); *H04L 61/2007* (2013.01)

(58) Field of Classification Search
None
See application file for complete search history.

(56) References Cited

U.S. PATENT DOCUMENTS

| | | | | |
|---|---|---|---|---|
| 6,938,170 B1* | 8/2005 | Kraft | ....................... | G06F 21/50 726/23 |
| 8,468,516 B1* | 6/2013 | Chen | ....................... | G06F 8/656 717/170 |
| 8,677,332 B1* | 3/2014 | Hjelmstad | ............... | G06F 8/443 717/140 |
| 2009/0031310 A1* | 1/2009 | Lev | ......................... | G06F 9/466 718/101 |
| 2012/0042324 A1* | 2/2012 | Breker | ................ | G06F 11/1004 718/107 |
| 2017/0357813 A1* | 12/2017 | Petersen | ................ | G06N 20/00 |

* cited by examiner

*Primary Examiner* — Philip Wang
(74) *Attorney, Agent, or Firm* — Schwegman Lundberg & Woessner, P.A.

(57) ABSTRACT

Generally discussed herein are systems, apparatuses, and methods for patching a binary file using a nested executable. In one or more embodiments, a system can include a memory including a nested binary file stored thereon, the nested binary file including a child executable and a parent executable, the child executable configured as a payload of the parent executable, the parent executable including instructions that, when executed by an intermediate device, cause the intermediate device to identify a value of a variable of the child executable, determine a memory location on the target device corresponding to the variable, write the value of the variable to the child executable, and throw the child executable to the target device after writing the value of the variable to the determined memory location, and communications circuitry configured to provide the nested binary file to the intermediate device.

20 Claims, 4 Drawing Sheets

PATCHING A BINARY FILE

TECHNICAL FIELD

Embodiments discussed herein generally relate to systems and methods for assembling and deploying a binary file to a target device. Some embodiments regard patching a binary file while the binary file is deployed, but before the binary is deployed to the target device.

BACKGROUND

A binary file is a file stored in a binary (e.g., ".bin") format. The binary file can be a part of an executable program or a numeric data file, among others. Binary files are generally machine-readable and not human readable.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

DETAILED DESCRIPTION

Figure 1:
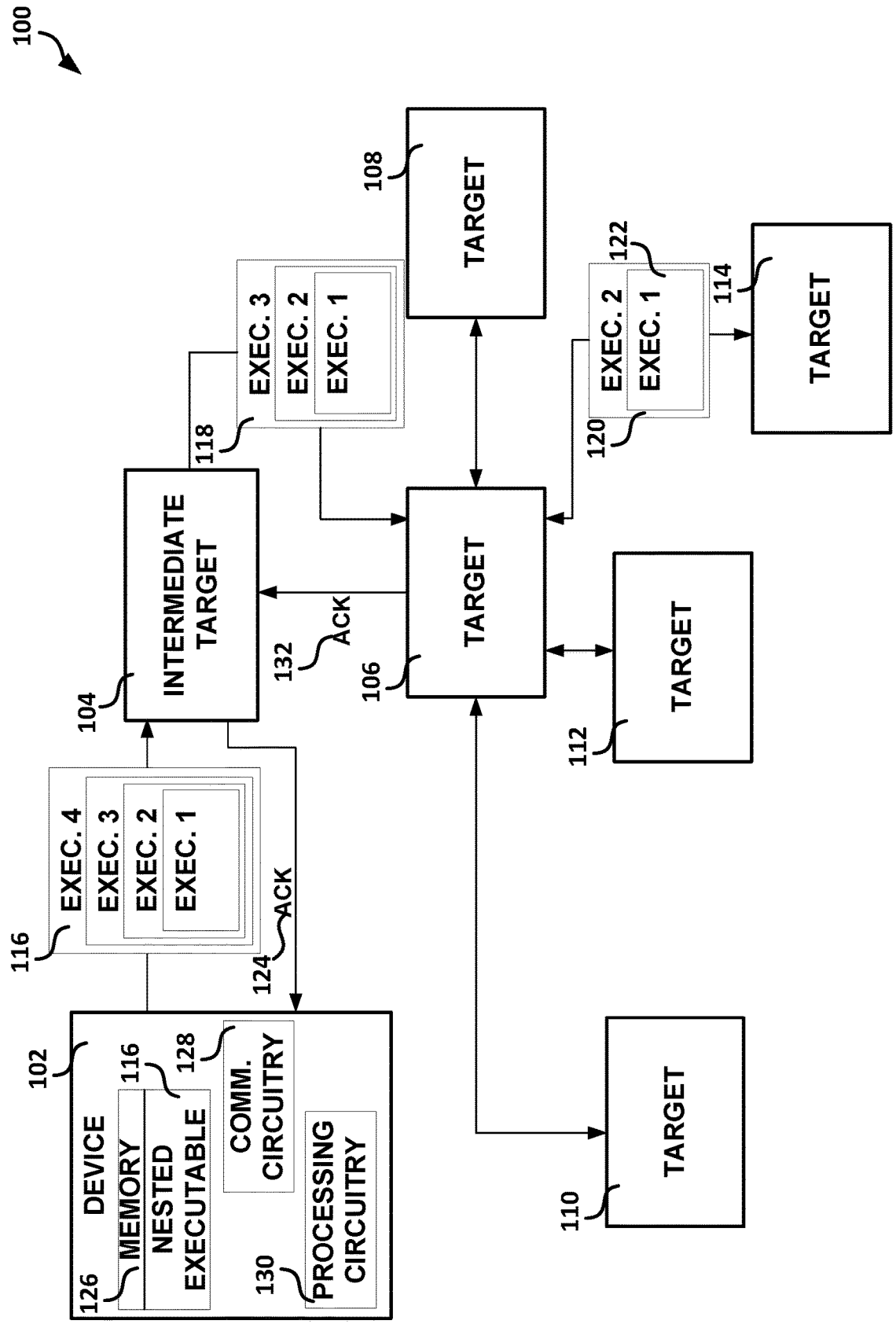
FIG. 1 illustrates, by way of example, a diagram of an embodiment of a system for binary patching.

Embodiments in this disclosure generally relate to generating "nested" binary files. Some embodiments regard using nested binary files to alter (sometimes called "patch") one or more of the further nested binary files. A patch is a change to a binary file. A patch is intended to cause the binary file to execute in an intended manner.

An executable can be deployed to a first device. However, a target of an executable can be deeper into a network than the first device. Often, an entity that generated the executable does not have complete information of the network to which the binary was deployed. For example, the entity may not know an internet protocol (IP) addresses, port numbers, or an exact path to the target. In such situations, the entity needs to gain knowledge of the missing information. Then the entity can develop an executable that penetrates the network to the target. This approach is time consuming and sometimes very difficult to achieve as the information required is difficult to obtain. An improved approach is desired.

A binary file can be patched through deployment of a second binary generated off the device and provided to the device on which the original binary resides. Execution of the second binary then alters the original binary to patch the original binary file. However, such a deployment requires direct access to the device that includes the original binary.

Embodiments herein overcome at least some of the deficiencies of prior approaches. Embodiments can include defining one or more variables of a nested binary file as patchable. This definition informs a parent executable that some information can be altered in a child executable. The parent executable can then attempt to identify the information for the patchable variable. The parent executable can then alter the child executable to change a valued of an identified patchable variable. The child executable can then be thrown to a next target from the current target and the process can continue until an ultimate target receives a payload.

By having the ability to change one or more variables used in the binary from the host binary (sometimes called a parent executable) it saves having to manually alter and upload the nested binary simply due to needing to change things like an IP address of the target, port of the target, location coordinates (e.g., global positioning system (GPS), universal transverse mercator (UTM), or the like) of the target, a date, time or other capability-based variables. Advantages provided by one or more embodiments include one or more of: 1) storing a variable to be patched at a specific address (a static address or a relative address) of the memory storing the compiled binary, 2) information about the patchable variables of a child executable stored as a configuration item in a host binary that will throw the child executable, or 3) while the host binary is executing it will be able to patch the child binary with the information passed in the configuration when the host binary was built.

The executables discussed herein can be monolithic or non-monolithic programs. A monolithic program runs from start to finish with no intervention from a user after deployment. Monolithic programs are distinct from object oriented or event driven (OOED) programs. An OOED program uses objects that respond to events generated by a user. A user interacts with an OOED while it executes and thus alters the code of the OOED that is executed. User interaction, in contrast, does not affect the execution of a monolithic program.

Some executables discussed herein can be built to run with user interaction. The binary (sometimes called an executable) can include a C2 (Command and Control) module that is specifically included to give the ability for a user interaction with the binary. The C2 module can use TCP/IP or other forms of networking capabilities, a serial or universal serial bus (USB) port, or the like. The options for C2 depend on an environment of the target and embodiments are flexible to allow for C2 flexibility.

FIG. 1 illustrates, by way of example, a diagram of an embodiment of a system 100 for binary patching. The system 100 as illustrated includes a deployment device 102 and a network of target devices 104, 106, 108, 110, 112, 114. The device 102 is the entity that delivers a nested executable 116. The device 102 can be, but is not necessarily, the device on which the executable is compiled, coded, or otherwise generated.

The device 102 is any device capable of transmitting the executable 116 to the target 104. The device 102 can be, for example, a computing device, such as a laptop computer, desktop computer, router, switch, printer, gateway, network bridge, modem, access point, repeater, smartphone, file server, application server, database server, firewall, network interface controller (NIC), universal serial bus (USB) memory stick (or memory stick adhering to another communication protocol), an external hard drive, an optical drive, or the like, or part of an unmanned or manned aerial, land, or water vehicle, a smart appliance, Internet of Things (IoT) device, or the like.

The device 102 as illustrated includes a memory 126, communications circuitry 128, and processing circuitry 130. The memory 126 includes the nested executable 116 stored thereon. The nested executable 116 includes instructions that, when executed by an intermediate target 104, or other target 106, 108, 110, 112, 114, cause the target to perform operations for getting a payload of the nested executable 116 to an ultimate target (the target 114 in the example of FIG. 1).

The communications circuitry 128 includes electric or electronic components configured to provide the nested executable to the intermediate target 104. In some embodiments, the communications circuitry 128 includes electric or electronic components configured to receive an acknowledge 124 or other communication indicating a status of the progress of the nested executable in the system 100. The acknowledge 124 can indicate whether the nested executable 116 was received at the intermediate target 104 or whether one or more operations of the parent executable of the nested executable 116 ("EXEC. 4" in the example of FIG. 1) was carried out or not. In this way, the device 102 can be made aware of the success or failure of the nested executable 116.

The device 102 as illustrated further includes processing circuitry 130. The processing circuitry 130 performs arithmetic or other data processing operations of the device 102. The processing circuitry 130 can include electric or electronic components configured to execute instructions of a memory of the device 102. The electric or electronic components of the communications circuitry 128 or the processing circuitry 130 can include a transistor, resistor, capacitor, inductor, diode, radio (transmit, receive, or transceiver radio), multiplexer, logic gate (e.g., AND, OR, XOR, negate, buffer, or the like), central processing unit (CPU), graphics processing unit (GPU), field programmable gate array (FPGA), application specific integrated circuit (ASIC), modulator, demodulator, antenna, phase locked loop, oscillator, switch, analog to digital converter (ADC), digital to analog converter (DAC), a wired communications interface (e.g., a universal serial bus (USB), fiber optic, serial or parallel advanced technology attachment (ATA), firewire, serial peripheral interface (SPI), inter-integrated circuit (I2C), or the like), or the like.

While not illustrated in FIG. 1, each of the intermediate device 104 and the targets 106, 108, 110, 112, 114 can include one or more of a memory (e.g., similar to the memory 126), communications circuitry (e.g., including same or similar components as the communications circuitry 128), or processing circuitry 130 (e.g., include same or similar components as the processing circuitry 130).

In FIG. 1, an executable 116 with three nested executables is communicated from the device 102 to an intermediate target 104. The target 104 executes the outermost binary (the parent binary). In performing the operations of the executable 116, the target identifies one or more patchable variables of the outermost executable 118 of the nested executables. The patchable variables can be associated with an identifier that indicates the value of the variable can be altered during execution of the parent binary. The target 104 can then execute operations of the executable to alter the patchable variables to change their respective values. The operations of the executable 116 can cause the executable 118 to be thrown to and subsequently executed at the target 106.

As previously discussed, the patchable variables can include an IP address of the target 106, a port number of the target 106, or the like. The operations, performed by the target 104, to change the patchable variable can include a query, ping, or the like to identify the proper value of the patchable variable. The operations, performed by the target 104, to change the patchable variable can include writing to a memory address of the target 104 to which the patchable variable is stored. The writing can include altering the data at the memory address to reflect the result of the query, ping, or the like.

Determining the proper address of the memory to which to write can include performing an "object mapping" command to query the addresses and offsets of the patchable variables. The results of the query, ping, or the like, can then be written to the addresses indicated by the data returned in response to the object mapping command. Examples of object mapping commands include objdump, tdump, dumbin, readelf, otool command, or the like. Note that these commands return information regarding an object file (e.g., an executable function or functions). The information returned by these commands can include an architecture for which the object file was compiled, a start address of the object file, contents of assembler code, header information, among other information. Thus, the information returned by these commands can be used to identify a location of a patchable variable in the memory of the current target. These commands facilitate retrieving information from the objects and storing it in a configuration file for a nested executable. When the next outer executable is being built, the executable can generate a structure table and be able to map into the offset of the binary data to patch a patchable variable.

This process can continue until an ultimate binary payload 122 is executed by the ultimate target device (e.g., target 114 in the example of FIG. 1). The ultimate target device in the example of FIG. 1 is the target 114. This process can thus be used to deliver a binary payload to a target in situations for which there is unknown information. The unknown information can be gained by including the unknown variables as patchable variables and generating a parent executable that seeks out the unknown information and changes a value associated with the child executable. Embodiments regarding how to generate the nested executables are now provided.

Figure 2:
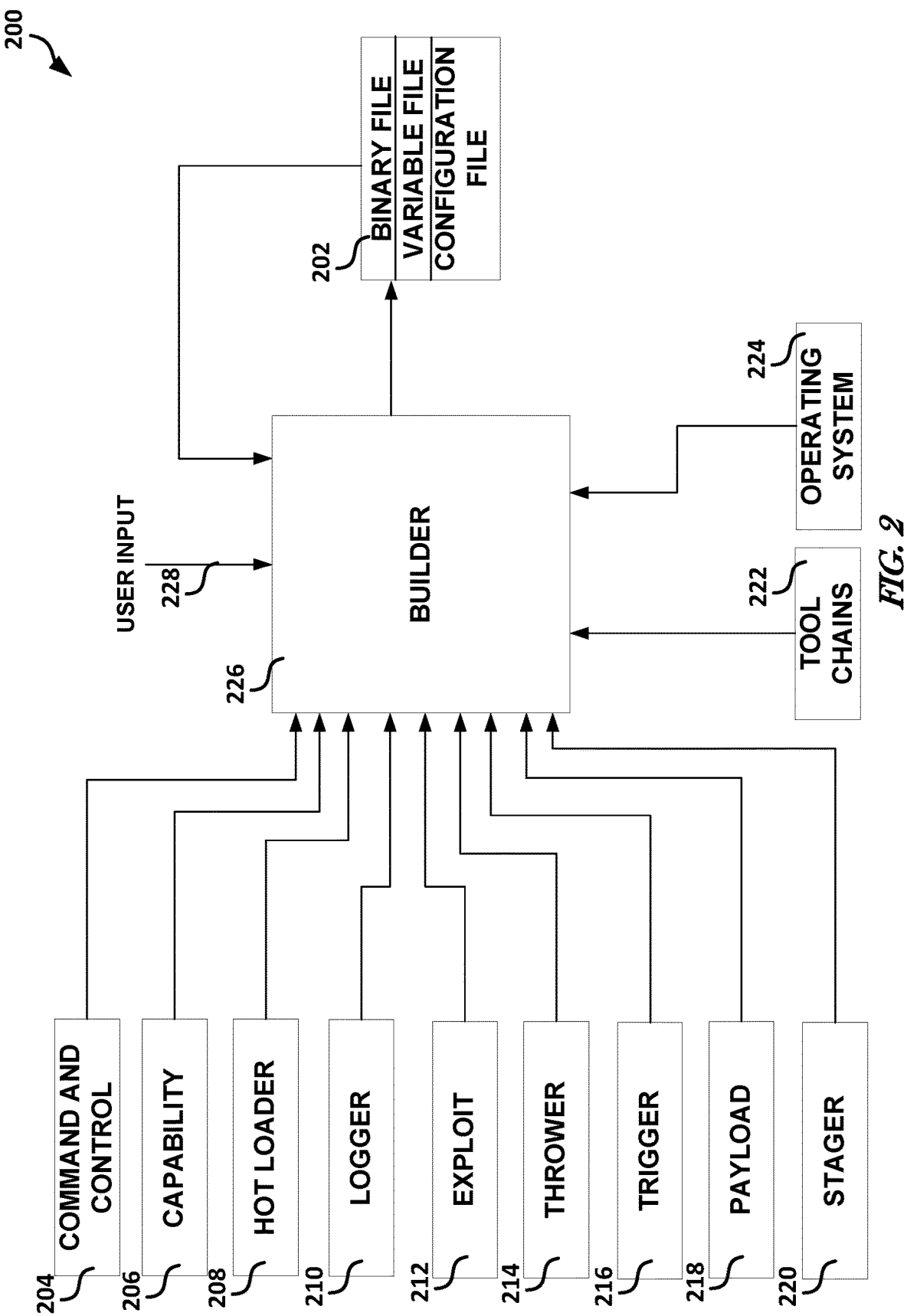
FIG. 2 illustrates, by way of example, a diagram of an embodiment of a system for generating a nested executable.

FIG. 2 illustrates, by way of example, a diagram of an embodiment of a system 200 for generating a nested executable file 202. The system 200 as illustrated includes software descriptions of a variety of features that can be included in a binary file 202. The features can be selected, by a user through a user interface (UI), and assembled into the binary file 202 by a builder 226. The features as illustrated include command and control 204, capability 206, hot loader 208, logger 210, exploit 212, thrower 214, trigger 216, payload 218, and stager 220. Each of the features can have different instantiations for different tool chains 222 and/or operating systems 224.

The command and control 204 software can include an indication of how communication of a binary will occur. The command and control 204 software can include a driver, or the like, that, when executed, causes the device to have the ability to communicate using the communication protocol. The command and control 204 can include transmission control protocol/internet protocol (TCP/IP), user datagram protocol (UDP), open systems interconnection (OSI) connectionless-mode network service (CLNS) with transmission protocol four (TP4), internet control message protocol (ICMP), or the like.

The capability 206 software indicates a technology that is to be run after the binary file 202 has landed on the target. The capability can include running a service/daemon, configuring privileges of a file (e.g., access privileges, such as read or write access or the like), writing to a file, configuring privileges of a user or application (e.g., service/daemon, an executable, or the like), deleting a file, deleting an index to a file, or the like.

The hot loader 208 software provides the capability to update code in a running application without restarting or resetting an application state of the running application. Hot loading is sometimes called "hot swapping". The hot loader can be used for interactive development or updating deployed code without interrupting service.

The logger 210 software provides the capability to record details of a corresponding binary deployment process. Details that can be logged include whether an ack was received, a patchable variable that was changed, a value to which a patchable variable was changed, a trigger condition occurrence, whether any of the other features (e.g., command and control 204, capability 206, hot loader 208, exploit 212, thrower 214, trigger 216, payload 218, or stager 220) failed or were successful, a date/time of any of the details, or the like.

The exploit 212 software provides the ability to access a device, application, port, file, data, or the like, such as without permission. In general, an exploit is any attack that takes advantage of a vulnerability in an application (including an application plug-in, software library, or the like), operating system, network, or hardware. Examples of exploits include phishing, credential gathering and reuse, injection, cross-site scripting, and abuse of a broken authentication code or security misconfiguration. Types of exploits include denial of service, remote code execution, privilege escalation, and malware delivery. The vulnerability being exploited can include a buffer overflow, code injection, or side-channel attack. An exploit that a vendor is not aware of is called a "zero-day exploit".

The thrower 214 software provides the capability of opening a communication connection (e.g., a port or the like) to a target. The thrower 214 opens a communication channel for communication of a next executable of a nested executable.

The trigger 216 software defines when other features of the binary 202 are to occur. The trigger 216 can be defined temporally (e.g., at a specified time or a specified number of seconds after a specified event, or the like), spatially (e.g., when global positioning system (GPS) coordinates are equal to or within a specified distance of a specified location), or the like. The trigger 216 can be undefined in some embodiments. In such embodiments, the exploit can proceed without a trigger.

The payload 218 software is raw binary that causes an operation to be performed by the device on which it landed (sometimes called the target). The payload 218 can be executed and can include a nested binary. The payload for a device upstream from a final target can include a nested binary and can include instructions to throw the nested to a next target downstream towards the final target.

The stager 220 software provides the ability to launch the payload 218 on the target. Often times, a target device does not have a file, application, configuration, or the like, required to execute the payload 218. The stager 220 configures the target to include the items required to execute the payload. The stager can, for example, store a file, install a TCP server (or other type of server, such as a proxy server), install an application, or the like.

As previously discussed, each of the features can require different syntax, library file, header, metadata, or the like, to operate properly on different tool chains 222 and/or operating systems 224. Examples of tool chains 222 include advanced RISC (reduced instruction set computer) machine (ARM), x86, mixed integer programming (MIP), x84, Power, scalable processor architecture (SPARC), Itanium, among many others. Examples of OSs 224 include Windows® XP, Windows® 7, Windows® 10, Windows® 8, Android, Linux, Unix, or the like. Each of the features can include an instantiation for each unique combination of tool chain 222 and OS 224, such that the builder 226 can generate a binary file 202 regardless of the selected feature(s) or tool chain(s) 222.

The builder 226 assembles the code from code repositories and builds the nested binary file 202. Referring to FIG. 1, the builder 226 can build the executable 122, then build the executable 120 to include the executable 122 and an instruction to throw the executable 122 to the target 114. The executable 118 can then be built to include the nested executable 120, and so on.

Using the system 200, multiple capabilities can be included in a single payload. Each built nested executable can have a corresponding container. Each container can target a different exploit or include a different capability. Shared variables between containers can be scoped to be visible to multiple containers. Scoping a variable alters which programs of parts of programs can see or use the variable. Normally, variables are global by default, but this can be changed in the program by instantiating the variable in a different manner. Examples of scoping functions include my( ) and local( ) in Perl. Other programming languages can have similar scoping functions. The system 200 further allows multiple command and control connections for a container or executable. This allows for missions with different command and control capabilities to use a same cyber payload.

An example of the binary patching is described assuming a user uses a python builder 226 to alter a program written in C and issues an objdump command. The python builder 226 walks the user through various inputs like host architecture, host OS, target architecture, target OS, software selection (e.g., command and control 204 software, capability 206 software, hot loader 208 software, logger 210 software, exploit 212 software, thrower 214 software, trigger 216 software, payload 218 software, stager 220 software, or the like), or the like. As the user goes through these steps and configures the default values and controlling module for the variables of the application, at one step, the builder 226 asks the user if any of the variables are desired to be patchable. If the answer is yes, the user selects the patchable variables so the builder knows to store information about those variables. The builder 226 uses an objdump command and pulls information from the symbol table. Here is some example output from issuing objdump command on a program called factorial.

```
objdump -x factorial
factorial: file format elf64-x86-64
factorial
architecture: i386:x86-64, flags 0x00000112:
EXEC P, HAS SYMS, D PAGED
start address 0x0000000000400440
Program Header:
PHDR        off    0x0000000000000040    vaddr 0x0000000000400040
    paddr 0x0000000000400040 align 2**3
    filesz    0x00000000000001f8    memsz 0x00000000000001f8 flags r-x
INTERP      off    0x0000000000000238    vaddr 0x0000000000400238
    paddr 0x0000000000400238 align 2**0
```

```
    filesz       0x000000000000001c       memsz
0x000000000000001c flags r--
    EH_FRAME    off    0x0000000000000694    vaddr
0x0000000000400694
    paddr 0x0000000000400694 align 2**2
    filesz       0x0000000000000024       memsz
0x0000000000000024 flags r--
    STACK    off    0x0000000000000000    vaddr
0x0000000000000000
    paddr 0x0000000000000000 align 2**3
    filesz       0x0000000000000000       memsz
0x0000000000000000 flags rw-
    RELRO    off    0x0000000000000e18    vaddr
0x0000000000600e18
    paddr 0x0000000000600e18 align 2**0
    filesz       0x00000000000001e8       memsz
0x00000000000001e8 flags r--
Dynamic Section:
    NEEDED libc.so.6
    INIT 0x00000000004003f0
    FINI 0x0000000000400668
    HASH 0x0000000000400298
    GNU_HASH 0x00000000004002c0
    STRTAB 0x0000000000400340
    SYMTAB 0x00000000004002e0
    STRSZ 0x000000000000003f
    . . . .
Version References:
    required from libc.so.6:
    0x09691a75 0x00 02 GLIBC_2.2.5
Sections:
Idx Name Size VMA LMA
    File off Algn
    0    .interp    0000001c    0000000000400238
0000000000400238
    00000238 2**0
    CONTENTS, ALLOC, LOAD, READONLY, DATA
    1    .note.ABI-tag    00000020    0000000000400254
0000000000400254
    00000254 2**2
    CONTENTS, ALLOC, LOAD, READONLY, DATA
    2 .note.gnu.build-id 00000024 0000000000400274
0000000000400274 00000274 2**2
    CONTENTS, ALLOC, LOAD, READONLY, DATA
    3    .hash    00000024    0000000000400298
0000000000400298
    00000298 2**3
    CONTENTS, ALLOC, LOAD, READONLY, DATA
    4    .gnu.hash    0000001c    00000000004002c0
00000000004002c0
    000002c0 2**3
    CONTENTS, ALLOC, LOAD, READONLY, DATA
    . . . . .
    18 .ctors 00000010 0000000000600e18
0000000000600e18 00000e18 2**3
    CONTENTS, ALLOC, LOAD, DATA
    19 .dtors 00000010 0000000000600e28
0000000000600e28 00000e28 2**3
    CONTENTS, ALLOC, LOAD, DATA
    20 .jcr 00000008 0000000000600e38
0000000000600e38 00000e38 2**3
    CONTENTS, ALLOC, LOAD, DATA
    21 .dynamic 000001a0 0000000000600e40
0000000000600e40 00000e40 2**3
    CONTENTS, ALLOC, LOAD, DATA
    22 .got 00000008 0000000000600fe0
0000000000600fe0 00000fe0 2**3
    CONTENTS, ALLOC, LOAD, DATA
    23 .got.plt 00000028 0000000000600fe8
0000000000600fe8 00000fe8 2**3
    CONTENTS, ALLOC, LOAD, DATA
    24 .data 00000010 0000000000601010
0000000000601010 00001010 2**3
    CONTENTS, ALLOC, LOAD, DATA
    25 .bss 00000010 0000000000601020
0000000000601020 00001020 2**3
    ALLOC
    26 .comment 00000023 0000000000000000
0000000000000000 00001020 2**0
    CONTENTS, READONLY
SYMBOL TABLE:
    0000000000400238 l d .interp 0000000000000000
    .interp
    0000000000400254      1      d .note.ABI-tag
0000000000000000
    .note.ABI-tag
    0000000000400274      1      d .note.gnu.build-id
0000000000000000
    .note.gnu.build-id
    0000000000400298 l d .hash 0000000000000000
    .hash
    00000000004002c0 l d .gnu.hash 0000000000000000
    .gnu.hash
    00000000004002e0 l d .dynsym 0000000000000000
    .dynsym
    0000000000400340 l d .dynstr 0000000000000000
    .dynstr
    0000000000400380 l d .gnu.version 0000000000000000
    .gnu.version
    0000000000400388      1      d .gnu.version_r
0000000000000000
    .gnu.version_r
    . . . .
    0000000000600e30 g O .dtors 0000000000000000
    .hidden _DTOR_END
    00000000004005a0 g F .text 0000000000000089
    _libc_csu_init
    0000000000601020 g *ABS* 0000000000000000
    _bss_start
    0000000000601030 g *ABS* 0000000000000000
    _end
    0000000000601020 g *ABS* 0000000000000000
    _edata
    0000000000400524 g F .text 0000000000000060
    main
    00000000004003f0 g F .init 0000000000000000
    _init
```

The builder 226 searches the output of the objdump command to find the line from the symbol table section that contains the variable name that the user wants to be a patchable input. The builder 226 then copies the address, offset, and variable name of that variable and stores it in two locations. One location is in a builder.c file (variable file) that is generated by the builder and contains all of the variables for the build (as well as the function renames for all the modules included in the binary). The address, offset, and variable name are also written to the configuration file for the executable. After the build is completed, when another binary is going to be built containing the one that was just built, the builder uses the configuration file from that executable, and if it has a non-empty section for patchable inputs, the builder 226 uses the variable name, address, and offset stored in the builder file or the configuration file to know what offset to which that variable is located. This is found in the section where the entire executable image is stored inside of the one being created as the wrapping executable. The wrapping executable places that information from the configuration file into the builder.c file it generates so it knows when the user, or executable, attempts to change the variable, the code will know what offset into the binary location it needs to modify.

The binary patching only works 1 level deep. So if 2 levels of nested executables each level must provide patching support in order for it to work. The outer level cannot patch the innermost variables since it will not have the necessary information to patch those variables.

Figure 3:
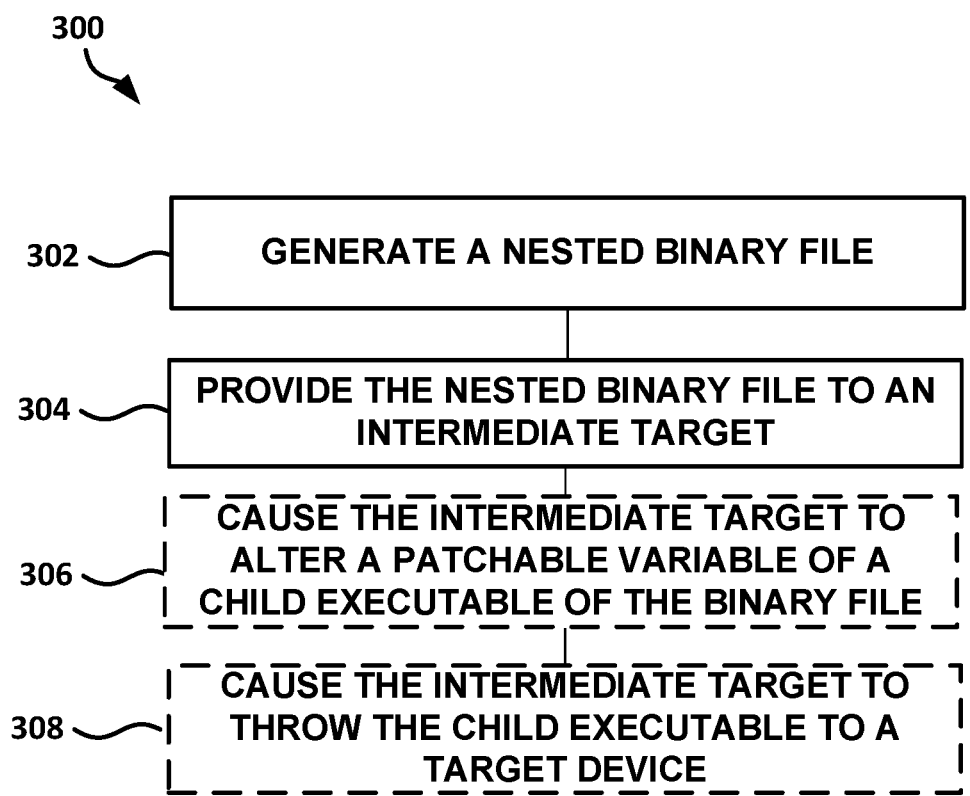
FIG. 3 illustrates, by way of example, a flow diagram of an embodiment of a method for deploying a nested executable to a target device.

FIG. 3 illustrates, by way of example, a flow diagram of an embodiment of a method 300 for patching a variable using a nested binary file. The method 300 as illustrated includes generating a nested binary file, at operation 302; and providing the nested binary file to an intermediate target, at operation 304. The nested binary file can include the child executable and a parent executable.

The method 300 can further include causing the intermediate target to alter a patchable variable of the child executable of the binary file, at operation 306. The child executable can be configured as a payload of the parent executable. The parent executable can include instructions that, when executed by the intermediate target, cause the intermediate target to identify a value of a variable of the child executable. The parent executable can include instructions that, when executed by the intermediate target, determine a memory location on the intermediate device corresponding to the variable. The parent executable can include instructions that, when executed by the intermediate target, write the value of the variable to the child executable.

The method 300 can include causing the intermediate target to throw the child executable to the target device, at operation 308. The operation 308 can occur after writing the value of the variable to the determined memory location.

The method 300 can further include, wherein the variable is an internet protocol (IP) address of the target device or a port number over which to communicate with the target device. The method 300 can further include, wherein the parent executable includes further instructions that, when executed by the intermediate device, further cause the intermediate device to save a file, install an application, or alter a configuration of the intermediate device so that the intermediate device can execute the child executable.

The method 300 can further include, wherein the parent executable includes further instructions that, when executed by the intermediate device, further cause the intermediate device to only throw the child executable to the target device after determining a specified trigger event has occurred. The method 300 can further include, wherein the parent executable includes further instructions that, when executed by the intermediate device, further cause the intermediate device to issue a communication to the device indicating whether the child executable was successfully thrown to the target device.

The method 300 can further include, wherein identifying the value of the variable of the child executable includes issuing a communication to the target device to determine a value of the variable. The method 300 can further include, wherein writing the value of the variable to the determined memory location includes issuing an object mapping command to determine the memory location of the value of the variable.

Figure 4:
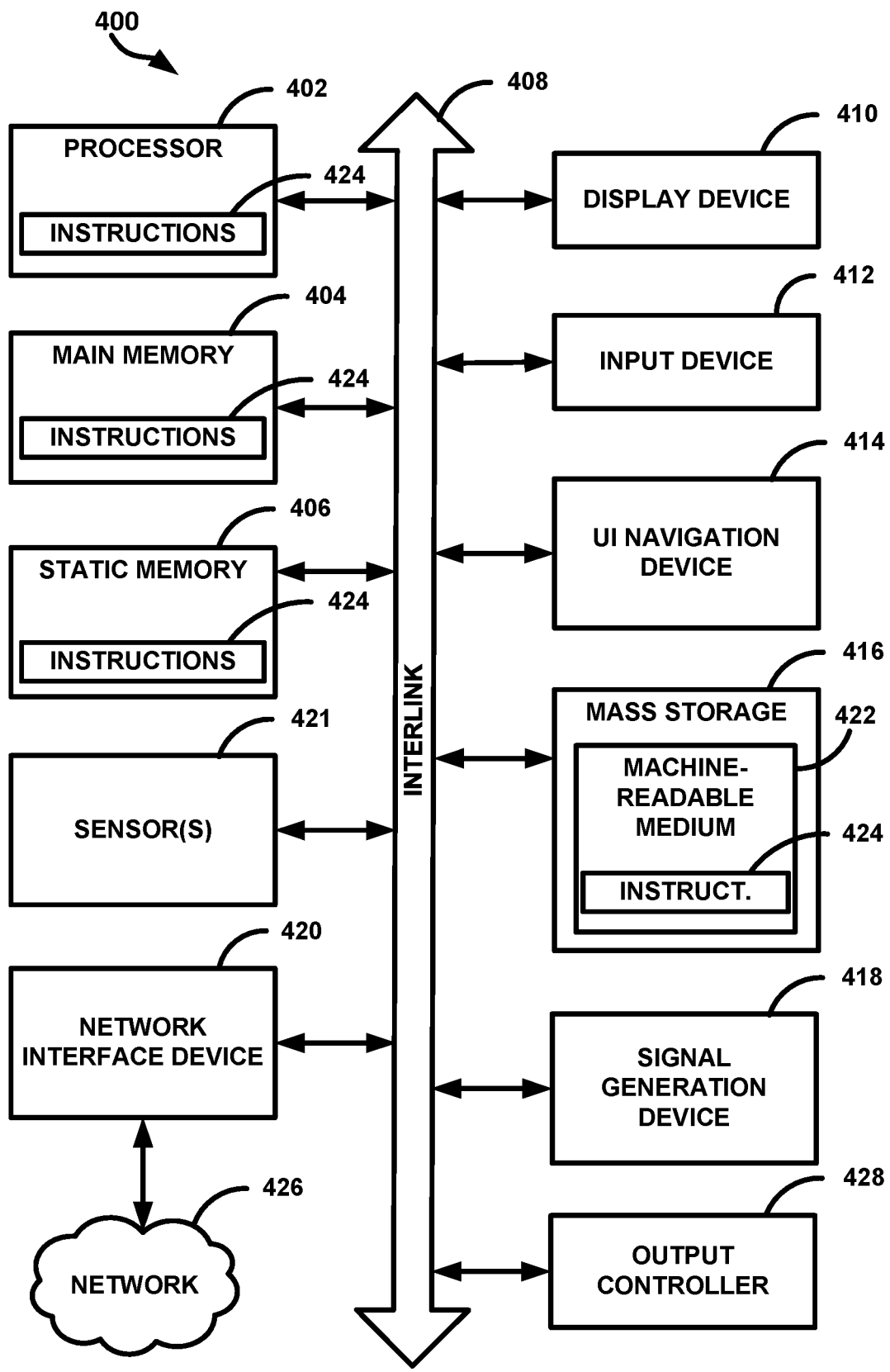
FIG. 4 illustrates, by way of example, a block diagram of an embodiment of a machine upon which any one or more of the processes (e.g., methodologies) discussed herein may be performed.

FIG. 4 illustrates, by way of example, a block diagram of an embodiment of a machine 400 upon which any one or more of the processes (e.g., methodologies) discussed herein may be performed. The device 102, target 102, 106, 108, 110, 112, 114, or builder 226 can include one or more of the items of the machine 400. Any of the command control 204 software, capability 206 software, hot loader 208 software, logger 210 software, exploit 212 software, thrower 214 software, trigger 216 software, payload 218 software, stager 220 software, or other devices or software of the system 200 can be implemented or executed using one or more components of the machine 400. In alternative embodiments, the machine 400 can operate as a standalone device or can be connected (e.g., networked) to other machines. In a networked deployment, the machine 400 can operate in the capacity of a server machine, a client machine, or both in server-client network environments. In an example, the machine 400 can act as a peer machine in peer-to-peer (P2P) (or other distributed) network environment. The machine 400 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate on, logic or a number of components, modules, or mechanisms. Modules are tangible entities (e.g., hardware) capable of performing specified operations when operating. A module includes hardware. In an example, the hardware can be specifically configured to carry out a specific operation (e.g., hardwired). In an example, the hardware can include configurable execution units (e.g., transistors, circuits, etc.) and a computer readable medium containing instructions, where the instructions configure the execution units to carry out a specific operation when in operation. The configuring can occur under the direction of the executions units or a loading mechanism. Accordingly, the execution units are communicatively coupled to the computer readable medium when the device is operating. In this example, the execution units can be a member of more than one module. For example, under operation, the execution units can be configured by a first set of instructions to implement a first module at one point in time and reconfigured by a second set of instructions to implement a second module.

Machine (e.g., computer system) 400 can include a hardware processor 402 (e.g., a central processing unit (CPU), a graphics processing unit (GPU), a hardware processor core, or any combination thereof), a main memory 404 and a static memory 406, some or all of which can communicate with each other via an interlink (e.g., bus) 408. The machine 400 can further include a display unit 410, an alphanumeric input device 412 (e.g., a keyboard), and a user interface (UI) navigation device 414 (e.g., a mouse). In an example, the display unit 410, input device 412 and UI navigation device 414 can be a touch screen display. The machine 400 can additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 can include an output controller 28, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 can include a machine readable medium 422 on which is stored one or more sets of data structures or instructions 424 (e.g., software) embodying or utilized by any one or more of the process or functions described herein. The instructions 424 can also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 can constitute machine readable media.

While the machine readable medium 422 is illustrated as a single medium, the term "machine readable medium" can include a single medium or multiple media (e.g., a centralized or distributed database, and/or associated caches and servers) configured to store the one or more instructions 424.

The term "machine readable medium" can include any medium that is capable of storing, encoding, or carrying instructions for execution by the machine 400 and that cause the machine 400 to perform any one or more of the processes of the present disclosure, or that is capable of storing, encoding or carrying data structures used by or associated with such instructions. Non-limiting machine readable medium examples can include solid-state memories, and optical and magnetic media. In an example, a massed machine readable medium comprises a machine readable medium with a plurality of particles having resting mass. Specific examples of massed machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

EXAMPLES AND NOTES

The present subject matter can be described by way of several examples.

Example 1 includes a device comprising a memory including a nested binary file stored thereon, the nested binary file including a child executable and a parent executable, the child executable configured as a payload of the parent executable, the parent executable including instructions that, when executed by an intermediate device, cause the intermediate device to identify a value of a variable of the child executable, determine a memory location on the target device corresponding to the variable, write the value of the variable to the child executable, and throw the child executable to the target device after writing the value of the variable to the determined memory location, and communications circuitry configured to provide the nested binary file to the intermediate device.

In Example 2, Example 1 can further include, wherein the variable is an internet protocol (IP) address of the target device or a port number over which to communicate with the target device.

In Example 3, at least one of Examples 1-2 can further include, wherein the parent executable includes further instructions that, when executed by the intermediate device, further cause the intermediate device to save a file, install an application, or alter a configuration of the intermediate device so that the intermediate device can execute the child executable.

In Example 4, at least one of Examples 1-3 can further include, wherein the parent executable includes further instructions that, when executed by the intermediate device, further cause the intermediate device to only throw the child executable to the target device after determining a specified trigger event has occurred.

In Example 5, at least one of Examples 1-4 can further include, wherein the parent executable includes further instructions that, when executed by the intermediate device, further cause the intermediate device to issue a communication to the device indicating whether the child executable was successfully thrown to the target device.

In Example 6, at least one of Examples 1-5 can further include, wherein identifying the value of the variable of the child executable includes issuing a communication to the target device to determine a value of the variable.

In Example 7, Example 6 can further include, wherein writing the value of the variable to the determined memory location includes issuing an object mapping command to determine the memory location of the value of the variable.

Example 8 includes a method comprising generating, by a program builder, a nested binary file including a child executable and a parent executable, the child executable configured as a payload of the parent executable, the parent executable including instructions that, when executed by an intermediate device, cause the intermediate device to identify a value of a variable of the child executable, determine a memory location on the intermediate device corresponding to the variable, write the value of the variable to the child executable, and throw the child executable to the target device after writing the value of the variable to the determined memory location, and providing the nested binary file to the intermediate device.

In Example 9, Example 8 can further include, wherein the variable is an internet protocol (IP) address of the target device or a port number over which to communicate with the target device.

In Example 10, at least one of Examples 8-9 can further include, wherein the parent executable includes further instructions that, when executed by the intermediate device, further cause the intermediate device to save a file, install an application, or alter a configuration of the intermediate device so that the intermediate device can execute the child executable.

In Example 11, at least one of Examples 8-10 can further include, wherein the parent executable includes further instructions that, when executed by the intermediate device, further cause the intermediate device to only throw the child executable to the target device after determining a specified trigger event has occurred.

In Example 12, at least one of Examples 8-11 can further include, wherein the parent executable includes further instructions that, when executed by the intermediate device, further cause the intermediate device to issue a communication to the device indicating whether the child executable was successfully thrown to the target device.

In Example 13, at least one of Examples 8-12 can further include, wherein identifying the value of the variable of the child executable includes issuing a communication to the target device to determine a value of the variable.

In Example 14, Example 13 can further include, wherein writing the value of the variable to the determined memory location includes issuing an object mapping command to determine the memory location of the value of the variable.

Example 15 includes a non-transitory machine-readable medium including instructions that, when executed by a machine, cause the machine to perform operations comprising generating, by a program builder, a nested binary file including a child executable and a parent executable, the child executable configured as a payload of the parent executable, the parent executable including instructions that, when executed by an intermediate device, cause the intermediate device to identify a value of a variable of the child executable, determine a memory location on the intermediate device corresponding to the variable, write the value of the variable to the child executable, and throw the child executable to the target device after writing the value of the variable to the determined memory location, and providing the nested binary file to the intermediate device.

In Example 16, Example 15 can further include, wherein the variable is an internet protocol (IP) address of the target device or a port number over which to communicate with the target device.

In Example 17, at least one of Examples 15-16 can further include, wherein the parent executable includes further instructions that, when executed by the intermediate device, further cause the intermediate device to save a file, install an application, or alter a configuration of the intermediate device so that the intermediate device can execute the child executable.

In Example 18, at least one of Examples 15-17 can further include, wherein the parent executable includes further instructions that, when executed by the intermediate device, further cause the intermediate device to only throw the child executable to the target device after determining a specified trigger event has occurred.

In Example 19, at least one of Examples 15-18 can further include, wherein the parent executable includes further instructions that, when executed by the intermediate device, further cause the intermediate device to issue a communication to the device indicating whether the child executable was successfully thrown to the target device.

In Example 20, at least one of Examples 15-19 can further include, wherein identifying the value of the variable of the child executable includes issuing a communication to the target device to determine a value of the variable and wherein writing the value of the variable to the determined memory location includes issuing an object mapping command to determine the memory location of the value of the variable.

The above Description of Embodiments includes references to the accompanying drawings, which form a part of the detailed description. The drawings show, by way of illustration, specific embodiments in which methods, apparatuses, and systems discussed herein can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The flowchart and block diagrams in the FIGS. illustrate the architecture, functionality, and operation of possible implementations of systems, methods and computer program products according to various aspects of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The functions or processes described herein can be implemented in software, hardware, human implemented procedures, or a combination thereof. The software can consist of computer executable instructions stored on computer readable media such as memory or other type of storage devices. The term "computer readable media" is also used to represent any means by which the computer readable instructions can be received by the computer, such as by different forms of wired or wireless transmissions. Further, such functions correspond to modules, which are software, hardware, firmware or any combination thereof. Multiple functions can be performed in one or more modules as desired, and the embodiments described are merely examples. The software can be executed on a digital signal processor, ASIC, microprocessor, or other type of processor operating on a computer system, such as a personal computer, server or other computer system.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Description of Embodiments, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Description of Embodiments as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A device comprising: a memory including a nested binary file stored thereon, the nested binary file including a child executable and a parent executable, the child executable configured as a payload of the parent executable, the parent executable including instructions that, when executed by an intermediate device, cause the intermediate device to identify a value of a variable of the child executable, determine a memory location on a target device corresponding to the variable, write the value of the variable to the child executable, and throw the child executable to the target device after writing the value of the variable to the determined memory location, and communications circuitry configured to provide the nested binary file to the intermediate device.

2. The device of claim 1, wherein the variable is an internet protocol (IP) address of the target device or a port number over which to communicate with the target device.

3. The device of claim 1, wherein the parent executable includes further instructions that, when executed by the intermediate device, further cause the intermediate device to save a file, install an application, or alter a configuration of the intermediate device so that the intermediate device can execute the child executable.

4. The device of claim 1, wherein the parent executable includes further instructions that, when executed by the intermediate device, further cause the intermediate device to only throw the child executable to the target device after determining a specified trigger event has occurred.

5. The device of claim 1, wherein the parent executable includes further instructions that, when executed by the intermediate device, further cause the intermediate device to issue a communication to the device indicating whether the child executable was successfully thrown to the target device.

6. The device of claim 1, wherein identifying the value of the variable of the child executable includes issuing a communication to the target device to determine a value of the variable.

7. The device of claim 6, wherein writing the value of the variable to the determined memory location includes issuing an object mapping command to determine the memory location of the value of the variable.

8. A method comprising: generating, by a program builder, a nested binary file including a child executable and a parent executable, the child executable configured as a payload of the parent executable, the parent executable including instructions that, when executed by an intermediate device, cause the intermediate device to identify a value of a variable of the child executable, determine a memory location on the intermediate device corresponding to the variable, write the value of the variable to the child executable, and throw the child executable to a target device after writing the value of the variable to the determined memory location; and providing the nested binary file to the intermediate device.

9. The method of claim 8, wherein the variable is an internet protocol (IP) address of the target device or a port number over which to communicate with the target device.

10. The method of claim 8, wherein the parent executable includes further instructions that, when executed by the intermediate device, further cause the intermediate device to save a file, install an application, or alter a configuration of the intermediate device so that the intermediate device can execute the child executable.

11. The method of claim 8, wherein the parent executable includes further instructions that, when executed by the intermediate device, further cause the intermediate device to only throw the child executable to the target device after determining a specified trigger event has occurred.

12. The method of claim 8, wherein the parent executable includes further instructions that, when executed by the intermediate device, further cause the intermediate device to issue a communication to the device indicating whether the child executable was successfully thrown to the target device.

13. The device of claim 8, wherein identifying the value of the variable of the child executable includes issuing a communication to the target device to determine a value of the variable.

14. The device of claim 13, wherein writing the value of the variable to the determined memory location includes issuing an object mapping command to determine the memory location of the value of the variable.

15. A non-transitory machine-readable medium including instructions that, when executed by a machine, cause the machine to perform operations comprising: generating, by a program builder, a nested binary file including a child executable and a parent executable, the child executable configured as a payload of the parent executable, the parent executable including instructions that, when executed by an intermediate device, cause the intermediate device to identify a value of a variable of the child executable, determine a memory location on the intermediate device corresponding to the variable, write the value of the variable to the child executable, and throw the child executable to a target device after writing the value of the variable to the determined memory location; and providing the nested binary file to the intermediate device.

16. The non-transitory machine-readable medium of claim 15, wherein the variable is an internet protocol (IP) address of the target device or a port number over which to communicate with the target device.

17. The non-transitory machine-readable medium of claim 15, wherein the parent executable includes further instructions that, when executed by the intermediate device, further cause the intermediate device to save a file, install an application, or alter a configuration of the intermediate device so that the intermediate device can execute the child executable.

18. The non-transitory machine-readable medium of claim 15, wherein the parent executable includes further instructions that, when executed by the intermediate device, further cause the intermediate device to only throw the child executable to the target device after determining a specified trigger event has occurred.

19. The non-transitory machine-readable medium of claim 15, wherein the parent executable includes further instructions that, when executed by the intermediate device, further cause the intermediate device to issue a communication to the device indicating whether the child executable was successfully thrown to the target device.

20. The non-transitory machine-readable medium of claim 15, wherein identifying the value of the variable of the child executable includes issuing a communication to the target device to determine a value of the variable and wherein writing the value of the variable to the determined memory location includes issuing an object mapping command to determine the memory location of the value of the variable.

\* \* \* \* \*

UNITED STATES PATENT AND TRADEMARK OFFICE
CERTIFICATE OF CORRECTION

PATENT NO. : 10,983,804 B1  
APPLICATION NO. : 16/714472  
DATED : April 20, 2021  
INVENTOR(S) : Durkop, III et al.

Page 1 of 1

It is certified that error appears in the above-identified patent and that said Letters Patent is hereby corrected as shown below:

In the Specification

In Column 10, Line 66, delete "28," and insert --428,-- therefor

In Column 10, Line 67, delete "(USB)," and insert --(USB)),-- therefor

In the Claims

In Column 15, Line 8, in Claim 1, after "comprising:", insert a line break

In Column 15, Line 19, in Claim 1, delete "location," and insert --location;-- therefor In Column 15, Line 19, in Claim 1, after "and", insert a line break In Column 15, Line 50, in Claim 8, after "comprising:", insert a line break In Column 15, Line 61, in Claim 8, after "and", insert a line break In Column 16, Line 17, in Claim 13, delete "device" and insert --method-- therefor In Column 16, Line 21, in Claim 14, delete "device" and insert --method-- therefor In Column 16, Line 27, in Claim 15, after "comprising:", insert a line break In Column 16, Line 38, in Claim 15, after "and", insert a line break Signed and Sealed this  
Seventeenth Day of August, 2021

Drew Hirshfeld  
*Performing the Functions and Duties of the*  
*Under Secretary of Commerce for Intellectual Property and*  
*Director of the United States Patent and Trademark Office*